US012752499B2

(12) United States Patent
Bitencourt et al.

(10) Patent No.: US 12,752,499 B2

(45) Date of Patent: Oct. 6, 2026

(54) MONOLITHIC MOLDED FAN COMPONENTS AND METHOD FOR THEIR MANUFACTURE

(71) Applicant: Evapco, Inc., Taneytown, MD (US)

(72) Inventors: Lairton Roleto Bitencourt, Itú (BR); Márcio Rogério Lopes, Itú (BR); Daniel Strauss, Itú (BR); Marcos Eidi Hatori, Itú (BR)

(73) Assignee: Evapco, Inc., Taneytown, MD (US)

( * ) Notice: Subject to any disclaimer, the term of this patent is extended or adjusted under 35 U.S.C. 154(b) by 236 days.

(21) Appl. No.: 18/435,946

(22) Filed: Feb. 7, 2024

(65) Prior Publication Data

US 2024/0262053 A1 Aug. 8, 2024

Related U.S. Application Data

(60) Provisional application No. 63/483,724, filed on Feb. 7, 2023.

(51) Int. Cl.

*B29C 70/48* (2006.01)

*B29L 31/08* (2006.01)

(52) U.S. Cl.

CPC ......... *B29C 70/48* (2013.01); *B29L 2031/082* (2013.01); *F05D 2230/20* (2013.01); *F05D 2300/603* (2013.01)

(58) Field of Classification Search

CPC ..... B29C 70/547; B29C 70/548; B29C 33/76; B29C 70/462

See application file for complete search history.

(56) References Cited

U.S. PATENT DOCUMENTS 2,913,036 A * 11/1959 Smith .................. B29C 70/443 264/102

3,146,148 A * 8/1964 Mitchella ............... B21D 47/00 264/553

(Continued)

FOREIGN PATENT DOCUMENTS

GB 2491190 A * 11/2012 ............... B32B 5/18

WO 2017171703 A1 10/2017

OTHER PUBLICATIONS

International Search Report and Written Opinion issued in Patent Application No. PCT/US2024/014895 on May 23, 2024, 9 pages.

*Primary Examiner* — Matthew J Daniels

(74) *Attorney, Agent, or Firm* — Bookoff McAndrews, PLLC

(57) ABSTRACT

A method for making a fan blade or fan component of composite material including using a permanent core having a plurality of interconnected surface channels over its surface to facilitate resin flow; forming a reinforcing fabric envelope over the permanent core; closing a mold over the reinforcing fabric enveloped permanent core to form a mold cavity between a surface of the permanent core and an interior surface of the closed mold, and infusing a resin into an opening of the closed mold, allowing the resin to fill an entirety of the mold cavity via the permanent core surface channels, allowing said resin to cure, and releasing said fan blade or fan component from the mold; wherein said infusion of resin is accomplished with or without a positive pressure system and wherein said permanent core is not removed from said fan blade or fan component prior to use.

19 Claims, 4 Drawing Sheets

(56) References Cited

U.S. PATENT DOCUMENTS

| | | | | | |
|---|---|---|---|---|---|
| 4,560,523 | A * | 12/1985 | Plumley | B29C 70/865 | 425/389 |
| 5,132,069 | A * | 7/1992 | Newton | B29C 70/865 | 264/261 |
| 6,656,411 | B1 * | 12/2003 | McClure | B29C 70/547 | 264/510 |
| 6,773,655 | B1 * | 8/2004 | Tunis, III | B29C 70/546 | 425/389 |
| 7,473,385 | B2 * | 1/2009 | Stiesdal | F03D 1/0675 | 264/258 |
| 2003/0116262 | A1 | 6/2003 | Stiesdal et al. | | |
| 2004/0130072 | A1 * | 7/2004 | Sekido | B29C 70/48 | 264/40.1 |
| 2010/0189973 | A1 * | 7/2010 | Mikkelsen | B05B 3/001 | 156/245 |
| 2011/0168324 | A1 | 7/2011 | Ender | | |
| 2012/0263600 | A1 * | 10/2012 | Grove-Nielsen | B29C 70/48 | 416/223 R |
| 2013/0068389 | A1 | 3/2013 | Overgaard | | |
| 2015/0251362 | A1 * | 9/2015 | Kirkeby | B29C 70/541 | 425/500 |
| 2019/0277141 | A1 | 9/2019 | Gill | | |
| 2020/0079037 | A1 * | 3/2020 | Niesner | B29C 70/48 | |
| 2021/0088025 | A1 | 3/2021 | Larsen et al. | | |

* cited by examiner

MONOLITHIC MOLDED FAN COMPONENTS AND METHOD FOR THEIR MANUFACTURE

BACKGROUND OF THE INVENTION

Field of the Invention

The present invention relates to large lightweight molded fan blades, fan stacks and other fan components and methods for their manufacture.

Description of the Background

Composite materials find wide use in many industries due to their numerous advantages, such as design flexibility, light weight, chemical resistance, and reduction of the number of components. Many industries have applied composite materials in their products, taking advantage of these characteristics, including automotive and transport, construction, infrastructure and architecture, aerospace, energy, marine, and sports industries. In the case of large commercial or industrial composite material parts, for example fan blades, fan stacks and other fan components used in large scale industrial cooling towers, the manufacture is often done in stages. For example, the process for manufacturing large scale fan blades with composite materials is usually done in steps, with the main structure made in two separate parts, the suction side of the blade, and the pressure side of the blade. Each blade piece is made separately in different molds by vacuum resin infusion, in which a liquid resin is injected into and through a fiber reinforced structure. To maintain the lightness of the part, the fiber content is kept high relative to the resin component of the composite. This is important because the structural properties of composite materials are derived mainly from the fiber reinforcement. A high content of fiber reinforcement improves the structural performance, enhancing tensile strength and stiffness, while minimizing weight. Following the independent manufacture of two different solid unitary composite parts, the two pieces are bonded together, resulting in seam lines and substantial bond areas, typically at the leading and trailing edges of the blade, and often along the central line of the component (see FIG. 1). Most very large lightweight composite material fan blades are made using this process. These large and lightweight composite fan blades are typically used for industrial applications such as cooling towers, heat exchangers, condensers, evaporators, underground ventilation, cooling and air ventilation.

Another method that has been applied with success to the manufacture of large lightweight composite parts such as wind turbine blades is the so-called one-shot infusion molding process. The result is a blade without seam lines, but the one-shot process requires the use of a large vacuum bag and flexible inserts that are placed inside the part being manufactured (see FIG. 2) and then removed when the molding is complete.

Other composite molding technologies include resin transfer molding ("RTM") and Vacuum-assisted RTM ("VRTM" or "RTM light"). In RTM, a resin is injected into a two-part rigid mold to impregnate the fiber reinforcement. This process involves placing the dry fiber layup on a mold surface, closing the mold over the fiber layup and injecting thermosetting resin into the mold under high pressure to impregnate the fiber layup. To avoid resin leakage, the mold is sealed by compression of a flange gasket on an outside surface of the mold. More often, the reinforcing fibers of the layup are non-oriented and are characterized by high permeability to make the resin flow easily; these material characteristics are necessary for RTM to permit the resin to flow sufficiently to fill the mold and impregnate all of the layup. Typically, the RTM process cannot be used to produce components having a fiber reinforcement content greater than 50%. Attempts at increasing fiber content in RTM molding processes above 50% reduces the permeability of the fiber reinforcement, leading to the need to increase injection pressure, which in turn requires increasing the mold structural stiffness to avoid mold distortion or failure. So, RTM is not suitable for molding very large lightweight products, products that have widely variable composite thickness, products with complicated geometries, or high-performance materials which require oriented fiber fabric reinforcement. Additionally, RTM requires very high mold strength and stiffness to prevent distortion or opening of the mold under the high injection pressure. This requirement for a heavy reinforced mold results in a size limitation for the use of RTM, as mold costs and weight become impractical for the molding of large structures.

VRTM (RTM light) is a variation of RTM that uses a vacuum to pull the resin through a lightweight mold, resulting in substantially lower costs. However, VRTM suffers from the same inability to mold lightweight products, products with variable composite thicknesses or products with complicated geometries as with RTM.

SUMMARY OF THE INVENTION

The bonding process of two (or more) part molded fan blades and components is a critical manufacturing step which, even if done correctly, generates weak points in the structure that can compromise the integrity of the part and its mechanical strength.

Where the RTM and VRTM molding process do not require a bonding step which results in seams, the reinforcement layup and part geometry are limited due to the process limitations. Therefore, when the structural requirements are higher as in the case of large lightweight fan blades, RTM and VRTM are not optimal.

The use of the vacuum bag/flexible insert of the one-shot process requires a large quantity of consumable (non-reusable) materials and presents limitations when the component geometry presents small details or narrow cavities where the vacuum bag cannot fit. Another drawback of the one-shot process is the requirement for an opening in the part large enough for removal of the insert and infusion consumables (see FIG. 3). This requirement limits the types of parts/part geometries where the one-shot infusion process can be used. Also, the oneshot molding process is highly labor intensive due to setup and removal of the consumables.

Accordingly, there is a need for lower cost, less labor intensive methods for making large lightweight and seamless molded composite parts with variable composite thicknesses and complicated geometries.

The present invention overcomes the disadvantages of these prior art molding processes. According to one advantage of the invention, there is no seam line in the final product, which results in significant improvement in structural strength and in the time required for finishing processing. There is also a significant reduction in manufacturing time, both in the molding step and the elimination of the joining and finishing steps. Another important advantage is that there is no longer a need for consumable materials. The process according to the invention can be applied in the manufacture of any large lightweight composite material fan blade and fan components that would benefit from these advantages, for example, fan blades, hubs, stacks, ducts, chimneys, equipment casings and panels.

According to the process of the invention, a monolithic component is created by means of a single step infusion in a closed mold, creating a seamless structure. The interior of the part contains a core material that may be selected according to the structural, strength, and weight requirements for the finished component. Different materials can be used as the core, for example, a polymeric foam, or a natural material, such as balsa wood, among other possibilities. The core contains a series of channels on the surface that improve the infusion process allowing the resin to be infused into the component without need for additional consumable materials, and with use of a vacuum sufficient only to create lower pressure inside the mold allowing the atmospheric pressure to push the resin into the mold cavity. There is no requirement for positive pressure systems, as used in RTM methods, to force the resin into the cavity, although low positive pressure may be optionally used. The channels are designed with distribution patterns, depths, and spacing configured so that the entire mold cavity is entirely filled, even in parts with complicated geometries, for example, closed profiles with internal details and/or double curvatures (containing a change in direction in two or more planes), and the reinforcing fabric is completely wetted by the resin so that dry fabric spots that could compromise part quality are avoided. High performance reinforcement material such as, glass, carbon or aramid oriented fiber fabrics may be used, where the percentage of oriented fiber fabrics may make up from about 30% to about 100%, preferably about 60% to about 100%, and most preferably about 100% of the reinforcing material, further increasing composite strength and stiffness. The resulting improved manufacturing process reduces costs and improves the quality of the component, eliminating finishing adjustment operations and eliminating the need to perform additional lamination to reinforce the component. The resin infusion process of the invention can produce parts containing approximately 55% to 70% fiber reinforcement, preferably about 70%. This quantity of fiber reinforcement in the resin-fiber composite delivers high mechanical performance and, at the same time, low structural weight. According to the method of the invention, the size of the core relative to the finished product is selected to result in the same fiber content for the manufacture of the same part as with the vacuum resin infusion method, so that the same level of mechanical performance is achieved, with lower material and labor cost.

BRIEF DESCRIPTION OF THE DRAWINGS

The foregoing summary, as well as the following detailed description of the preferred invention, will be better understood when read in conjunction with the appended drawings. For the purpose of illustrating the invention, the drawings depict embodiments which are presently preferred. It should be understood, however, that the invention is not limited to the precise arrangements and instrumentalities shown. In particular, while the manufacture of a large lightweight fan blade is referenced herein for the exemplary purpose of describing the invention, the invention may also be used for the manufacture of small fan blades and other fan components, including hubs, casings and stacks. In the drawings.

DETAILED DESCRIPTION OF THE INVENTION

Figure 1:
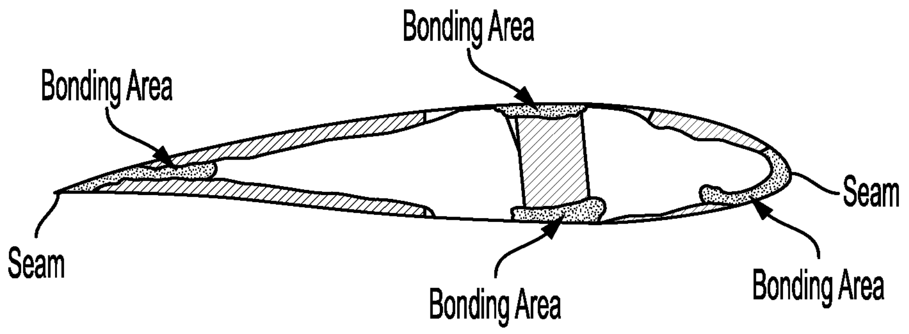
FIG. 1 PRIOR ART
FIG. 1 is a cross-sectional representation of a prior art fan blade manufactured in top and bottom parts that are glued together.
Figure 2:
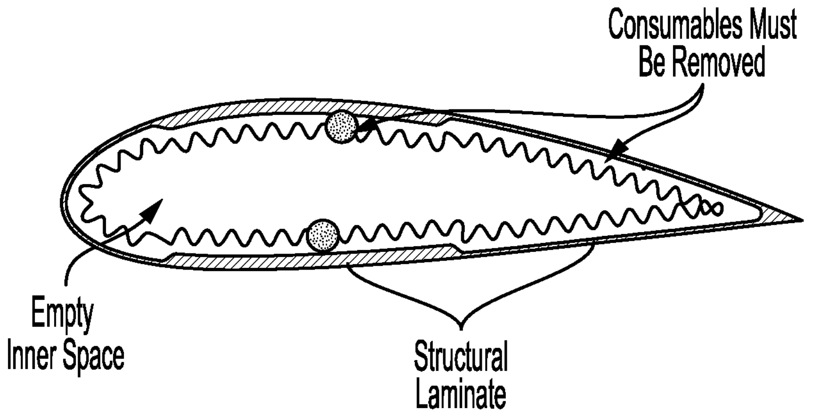
FIG. 2 PRIOR ART
FIG. 2 is a cross-sectional representation of a prior art fan blade manufactured using a one-shot vacuum bag and infusion consumables.
Figure 3:
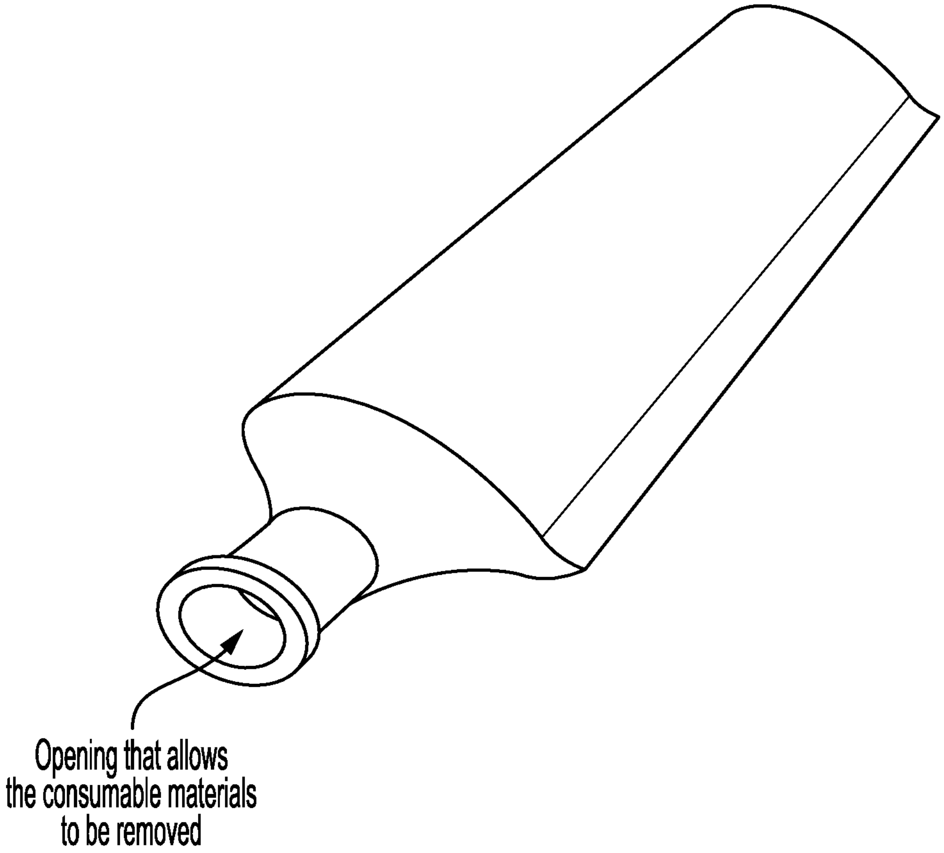
FIG. 3 PRIOR ART
FIG. 3 is a representation of a finished fan blade made according to the one-shot process showing the large opening through which the vacuum bag and infusion consumables are removed.
Figure 4:
FIG. 4 is a cross-sectional representation of a fan blade core according to embodiment of the invention.
Figure 5:
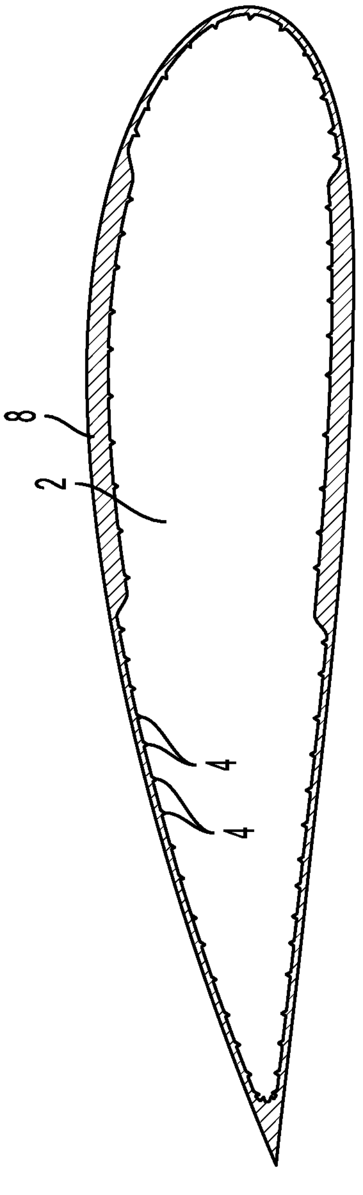
FIG. 5 is a cross-sectional representation of a finished fan blade according to embodiment of the invention shown a permanent core in the interior portion, and a molded resin/reinforcing fabric exterior shell.
Figure 6:
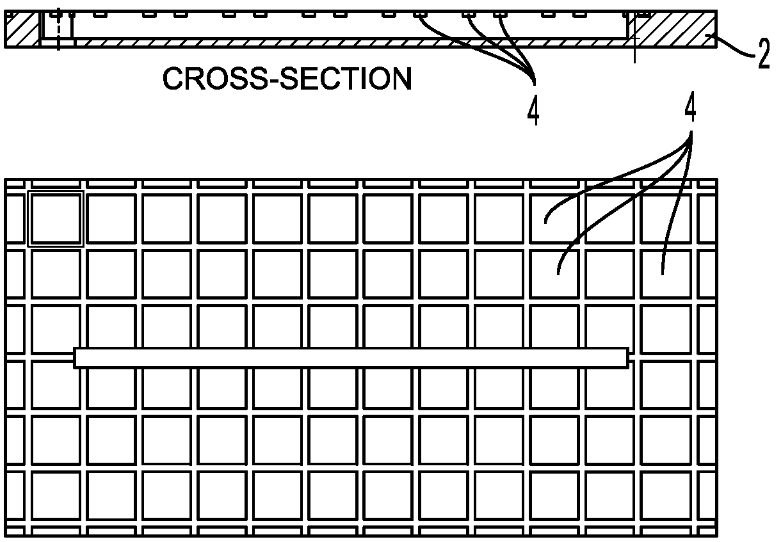
FIG. 6 shows an example of a channel pattern/network of channels that are impressed upon, carved into, or integrally molded onto, the surface of the core according to various embodiments of the invention.

The invention begins with the manufacture of a core generally in the shape of the final article, but reduced in size sufficient for a molded overlay of reinforcing fabric and resin to result in the final article. The core is preferably a single unitary element. FIG. 4 shows a cross-section of a core 2 for a fan blade according to an embodiment of the invention, including surface channels 4. FIG. 5 shows a cross-section of a final manufactured fan blade according to an embodiment of the invention with the reinforcing fabric and resin matrix 8 shown in cross-hatching over the core 2. According to the invention, the core is never removed from and remains part of the finished article. The core has on its surface a network of channels 4 configured to disperse the resin over the surface of the core during the molding of the final article. An example of a pattern of the channel network is shown in FIG. 6, although any pattern that provides an even distribution of resin over the core and through the reinforcing fabric is suitable. The core may be made of any lightweight material that will maintain its shape during the process of molding the final article. Examples of core material include various foam materials such as polyurethane foam, and balsa wood. The core may be manufactured according to any known method suitable for the material, including molding, carving, machining, etc. In the case of molding the core, the core may be molded, for example, using a closed mold. According to one embodiment, a first mold part is matched with second mold part to form a closed mold and the closed mold is filled with polyurethane foam to produce the foam core, including integrally molded matrix of channels. Following manufacture of the core, again according to any known method, the final article closed mold is prepared by laying reinforcing fabric across a mold piece, preferably in a plurality of layers. High performance reinforcement material such as, glass, carbon or aramid oriented fiber fabrics may be used, where the percentage of oriented fiber fabrics may make up from about 30% to about 100%, preferably about 60% to about 100%, and most preferably about 100% of the reinforcing material, further increasing composite strength and stiffness. The core is then placed in the final article mold piece, and remaining sections of reinforcing fabric is laid across the exposed surface of the core. The mold is then closed and sealed shut. Resin is directed into one or more openings in the mold in communication with one or more of the channels formed in the core, and drawn through the mold via a source of vacuum/negative pressure in communication with an interior of the mold through one or more openings. The channels formed in the core allow the resin to fill the entire mold cavity, saturating the reinforcing fabric and filling all voids, including regions of varying thicknesses within the same article, and articles with complicated geometries, for example, closed profiles with internal details and/or double curvatures (containing a change in direction in two or more planes). Once the resin has cured according to known methods, the mold is opened to reveal the fully molded article. Final deburring and finishing may then take place prior to shipping and/or assembly. Other than the single core, the reinforcing fabric and the resin, the finished article requires no other elements, parts or materials (except paint and/or other surface coating). Vacuum is used to cause the resin to fill the entirety of the mold cavity, but only enough vacuum to make the air pressure inside the mold less than ambient pressure, preferably from 500 mbar to 1000 mbar of negative pressure; positive pressure can be applied, if necessary to force the resin into the cavity. No additional reinforcing is used, and there is no requirement for sealing or bonding top and bottom parts.

The present invention results in a final article with the same or improved structural, strength, weight and surface features of prior art fan blades with substantially less material and labor costs.

It will be appreciated by those skilled in the art that changes could be made to the preferred embodiments described above without departing from the inventive concept thereof. It is understood, therefore, that this invention is not limited to the particular embodiments disclosed, but it is intended to cover modifications within the spirit and scope of the present invention as outlined in the present disclosure and defined according to the broadest reasonable reading of the claims that follow, read in light of the present specification.

The invention claimed is:

1. A method for making a fan blade or fan component of composite material including a permanent core and a fiber reinforced resin material, the method comprising:

placing a plurality of reinforcing fiber fabric layers comprising oriented fiber fabrics on a bottom part of a mold in a shape of said fan blade or fan component, placing a permanent core on said plurality of reinforcing fiber fabric layers in said bottom part of said mold, said permanent core having a shape that approximates a shape of said fan blade or fan component;

wherein said permanent core includes on its surface a resin inlet channel in fluid communication with a network of interconnected distribution channels in a grid pattern, said resin inlet channel having a limited length and a cross-sectional area that is greater than a cross-sectional area of said distribution channels, folding a remaining portion of said plurality of the reinforcing fabric layers over exposed portions of said permanent core to form a reinforcing fiber fabric-enveloped permanent core;

closing said mold over said reinforcing fiber fabric enveloped permanent core to form a mold cavity between a surface of said permanent core and an interior surface of said mold;

infusing a resin into an opening of said mold in communication with said resin inlet channel and allowing said resin to fill an entirety of said network of interconnected distribution channels, saturating the plurality of reinforcing fiber fabric layers and filling all voids;

allowing said resin to cure, and releasing said fan blade or fan component including said permanent core from said closed mold; and wherein said permanent core is not removed from said fan blade or fan component prior to use.

2. The method of claim 1, wherein said permanent core surface channels are integrally molded.

3. The method of claim 1, wherein said permanent core surface channels are formed after said permanent core has been molded.

4. The method of claim 1, wherein a vacuum source is applied to an interior of said mold sufficient only to reduce an air pressure of said interior to less than ambient air pressure.

5. The method of claim 1, wherein said fan blade or fan component has no seams or seam lines.

6. The method of claim 1, wherein said permanent core is a molded permanent core.

7. The method of claim 1, wherein said network of interconnected distribution channels cover of an entirety of said permanent core surface.

8. The method of claim 1, wherein said permanent core is a single unitary element.

9. The method of claim 1, wherein said reinforcing fiber fabric comprises greater than 60% oriented fiber fabrics.

10. The method of claim 1, wherein said reinforcing fiber fabric comprises 60%-70% of said fiber reinforced resin material.

11. The method of claim 1, wherein the permanent core comprises polyurethane foam or balsa wood.

12. The method of claim 1, wherein the oriented fiber fabrics comprise glass, carbon, or aramid fibers.

13. The method of claim 1, wherein the fan blade or fan component comprises a closed profile with double curvatures containing a change in direction in two or more planes.

14. The method of claim 1, wherein a vacuum of 500 mbar to 1000 mbar of negative pressure is applied to cause the resin to fill the mold cavity.

15. The method of claim 1, wherein the fan blade or fan component is selected from the group consisting of fan blades, hubs, stacks, ducts, chimneys, equipment casings, and panels.

16. The method of claim 1, wherein the oriented fiber fabrics make up about 100% of the plurality of reinforcing fiber fabric layers.

17. The method of claim 1, wherein the permanent core is manufactured by molding, carving, or machining.

18. The method of claim 1, wherein the permanent core is molded using a closed mold comprising a first mold part matched with a second mold part.

19. The method of claim 1, wherein the fiber reinforced resin material comprises approximately 70% fiber reinforcement.

* * * * *